Jan. 14, 1969    G. D. KENNEDY    3,421,248
FISH POLE
Filed July 31, 1967    Sheet _1_ of 2
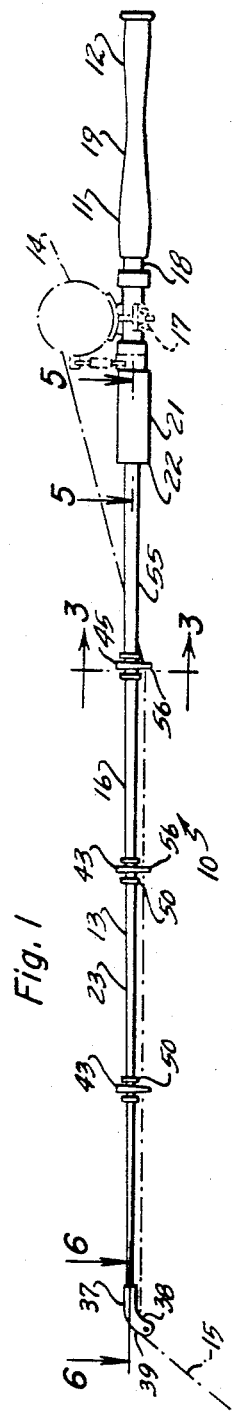
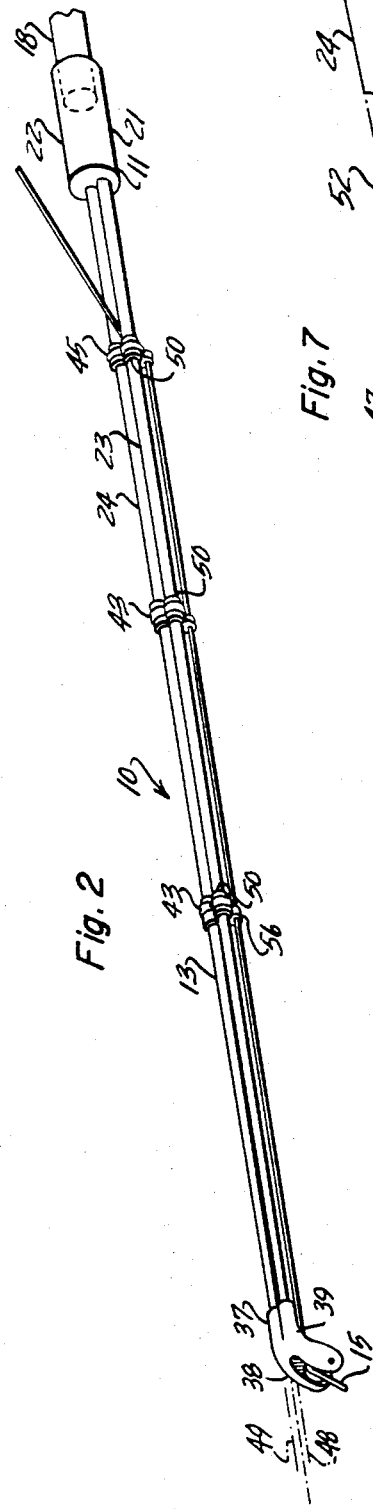
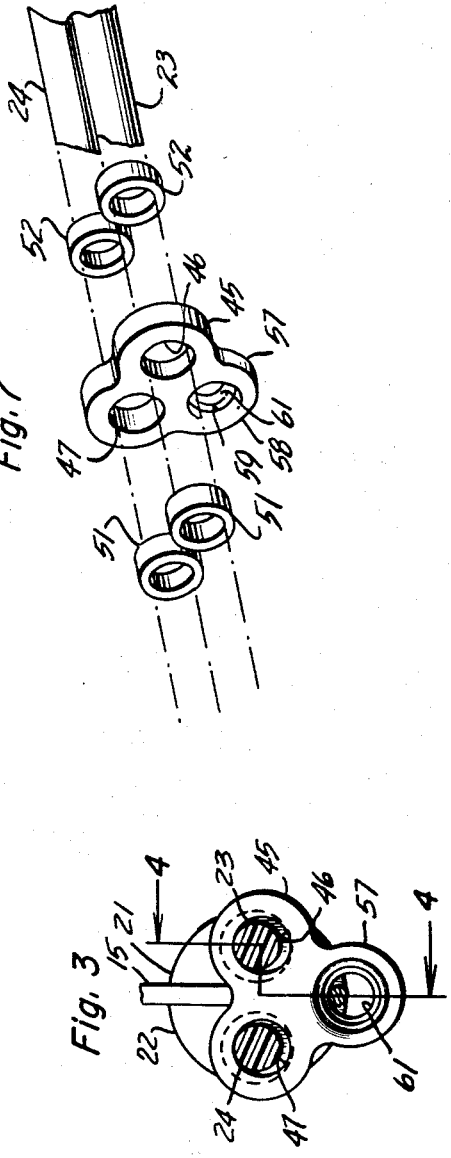
George D. Kennedy
INVENTOR.
BY Roger L. Martin
ATTORNEY Jan. 14, 1969  G. D. KENNEDY  3,421,248
FISH POLE
Filed July 31, 1967  Sheet 2 of 2
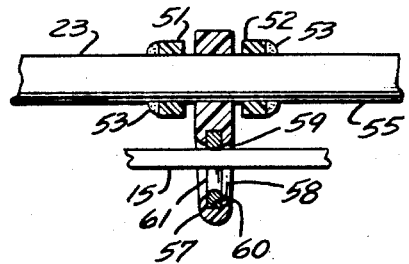
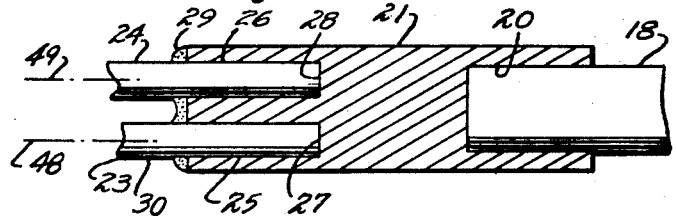
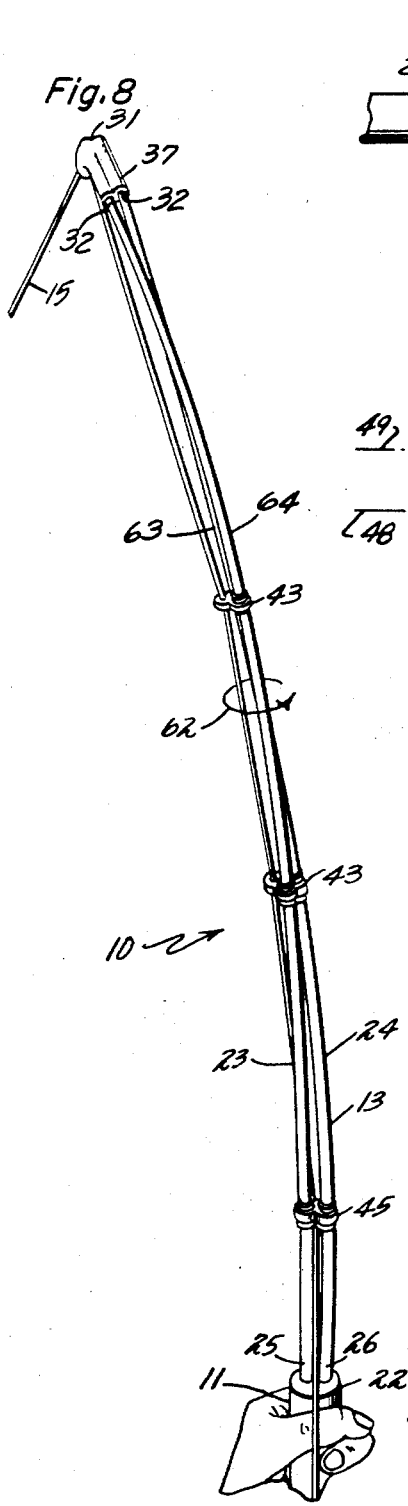
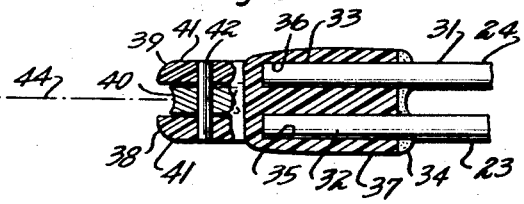
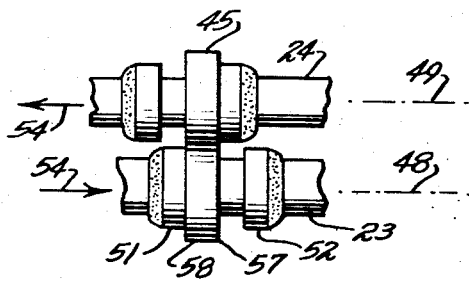
George D. Kennedy
INVENTOR.
BY Rosph L. Martin
ATTORNEY

United States Patent Office 3,421,248
Patented Jan. 14, 1969

3,421,248
FISH POLE
George D. Kennedy, 4415 Ocean Beach Blvd.,
Cocoa Beach, Fla. 32931
Filed July 31, 1967, Ser. No. 657,231
U.S. Cl. 43—24                                    5 Claims
Int. Cl. A01k 87/04

ABSTRACT OF THE DISCLOSURE

A fish pole has a line carrying assembly which includes a pair of elongated flexible rod-like members that are spaced apart and interconnected in a generally parallel arrangement. The rods are rigidly interconnected at their opposite ends but between their ends the rods are spaced apart by loose connecting spacers which are adapted and arranged to pivot on the rods and within certain limits to also move axially on the rods. The spacers may have line guide portions arranged on the opposite side of the pole from the reel member. The arrangement reduces the tendency of such poles to twist in the users hands when the line is dragged.

BACKGROUND OF THE INVENTION

The invention relates to fish poles of the kind that are equipped during use with a fishing reel for paying out and drawing in a fish line and in particular to fish poles that have a line carrying assembly which includes a pair of elongated and spaced rod-like members.

The commoner fish poles are of the mono-rod type with the line guides being mounted on the rod and at the same side of the pole as the reel. The reels, especially for poles used in salt water boat fishing endeavors, are relatively heavy and are usually located at the top side of the pole when the pole is horizontally extended. This creates an unbalanced condition in the overall arrangement, and apart from any drag in the line, has the tendency to twist the pole in the users hands. With the line guides also located along the top of the rod, the tendency for the pole to twist is aggravated when a drag on the line is encountered, and the pole is frequently very difficult to handle when a catch in the immediate vicinity of the boat is being hauled in and the pole is under severe bending conditions.

Attempts have been made to overcome this problem by providing duo-rod type pole structures that enable the guides to be mounted at the under side of the pole and in an arrangement where the line passes from the top side location for the reel through the space between the rods to the guides therebelow. This type of arrangement has the advantage that any drag on the line when the catch has been hauled into the vicinity of the fisherman tends to overcome the natural tendency of the pole to twist in the users hands under the influence of the weight of the reel.

The duo-rod type pole structures have not met with any great success however because the action realized during use of the poles has much to be desired. For one, the duo-rod type poles have a natural tendency to resist bending force moments directed at the rods sides of the poles since such force moments tend to place one rod under compression and the other rod under tension. Because of this, and since in the play of the game fish, the rod side forces are usually moments of a downward and laterally directed drag force on the line, the tip end of the pole bends downwardly and tends to twist in the direction of the rod side of the assembly. This downward bending, coupled with a laterally directed moment of the drag force exerts a twisting action on the pole assembly which makes it difficult for the sportsman to handle the pole and especially when sea water game fishing from boat locations.

SUMMARY OF THE INVENTION

A general object of the invention is to provide an improved fish pole of the duo-rod type.

Another object is to provide an improved fish pole of the duo-rod type and which is less resistant to bending moments originating from a rod side of the pole.

Yet another object is to provide an improved fish pole of the duo-rod type and which has a different action than conventional duo-rod type poles in that there is a reduced tendency of the pole to twist in the hands of the user when the drag on the line is laterally of the fisherman.

Another object is to provide an improved fish pole of the duo-rod type and which is inexpensive and less costly to manufacture.

Yet another object is to provide improvements in fishing poles that permit reels and line guides to be mounted on opposite sides of the pole and which provide an improved action as compared to prior duo-rod type poles.

Other objects will be apparent from the more detailed disclosure which follows.

Current duo-rod type fishing pole structures space the rods between the opposite ends of the rod assembly by rigid means which are fixed to the respective rods. This has the disadvantage, heretofore not fully appreciated, of limiting the bending action of the rod assembly in the rod side directions by preventing the rods from longitudinally moving with respect to each other as the pole is so being bent. In addition this type of arrangement has for practical purposes the effect of limiting the distribution of any twisting force that is imparted to one of the rods to a length of the rod which is determined by the spacing between the spacers, and overall the current rod spacing arrangements provide pole structures which are far too resistant to deflection toward the rod sides of the poles. Because of the fixed spacer connections with the rods, current duo-rod type fishing poles, under the influence of laterally directed drags on the line, generally bend down in the plane perpendicular to the plane of the rods and then twist in the direction of the drag force, the net result of which is to place a substantial twisting force on the handle assembly and which makes it difficult for the fisherman to manipulate the pole.

In overcoming this problem in accord with the invention I provide rod spacers between the ends of the rods in the duo-rod type fishing poles and which are loosely connected on the rods in a manner that permits each rod to twist in the connection with the spacer and to also axially move in the connection within certain limits. This arrangement provides greater mobility for the rods between their opposite ends and enables the rod under compression during rod side drags on the line to bend and yield to the forces on the line with the result that the pole is capable of bending toward the rod side of the assembly in a manner that reduces the twisting action on the handle assembly as compared to the prior art types. For one, the arrangement permits any twisting force that is imparted to one rod in the assembly to be distributed throughout the length of the rod and without restriction between its opposite ends from the connections therebetween with the other rod in the structure. This has the advantage that during rod side drags on the line, it is easier for the compression member to twist and bend between its opposite ends to enable rod side or lateral deflection of the overall line carrying assembly. When the pole deflects toward the rod side of the duo-rod type assembly, one rod moves axially in the assembly in relation to the other rod, and hence provisions are made to permit the axial movements of the rods in the connections with the spacers, certain stops being provided to nevertheless maintain a suitable overall spacing between adjacent rod spacers in the assembly.

One aspect of the invention has to do with locating the line guides on the loosely connected spacers. Under normal conditions, when the compression member bends under a rod side drag on the line, a length of the compression member tends to assume an "on top" relation to the tension member and further bending of the compression member is controlled by the spacer connection with the tension member. Consequently when extreme play of a fish is encountered, one rod will rapidly change in function from that of a compression member to one of a tension member in the assembly. This causes a rapid change in the relative location of certain lengths of the rods and by positioning the line guides on the spacers, the influence of the line on the spacers is such as to provide a shock absorbing action as the lengths move from one position to another in the assembly.

BRIEF DESCRIPTION OF THE DRAWINGS

A fishing pole embodying the concepts of the invention in a preferred form is shown in the accompanying drawings and wherein:

FIG. 1 shows a rod side elevational view of a reel equipped fishing pole embodying the invention as the pole is seen in a horizontal position.

FIG. 2 is a somewhat enlarged perspective view of the fishing pole shown in FIG. 1 with parts of the reel and handle assembly broken away.

FIG. 3 is an enlarged cross sectional view through the line carrying assembly of the embodiment shown in FIG. 1 as seen along the lines 3—3 therein and shows one of the line guide equipped rod spacers and the loose connections which are provided with the respective rods of the assembly.

FIG. 4 is a section view through the line guide equipped spacer shown in FIG. 3 along with adjacent structure as generally seen along the line 4—4 of FIG. 3.

FIG. 5 is an enlarged horizontal section view at the connection between the line guide assembly and the handle assembly of the pole shown in FIG. 1 as generally seen along the line 5—5 therein.

FIG. 6 is an enlarged view of the connection between the rods at the tip of the line carrying assembly seen in FIG. 1, the view being generally along the line 6—6 therein and with parts broken away to expose the pulley arrangement for the line guide at this end of the assembly.

FIG. 7 is an exploded perspective view of the guide equipped spacer and adjacent stop elements shown in FIGS. 1 and 4 along with fragments of the rods.

FIG. 8 is a top view of the pole shown in FIG. 1 as seen when gripped under conditions wherein a rod side drag is being applied to the line and shows the pole when it is bent toward one of the rod sides of the assembly, certain parts being broken away.

FIG. 9 is a top plan view of the spacer shown in FIG. 4 together with adjacent structure and serves to illustrate the axial movements of the rods in the spacers.

DESCRIPTION OF THE PREFERRED EMBODIMENT

A fish pole embodying the concepts of the invention is shown in FIG. 1 and is generally designated at 10. The pole is illustrated in a preferred form for use in salt water game fishing and includes a handle assembly 11 at the base end 12 of the pole and an elongated, line carrying assembly 13 which is bendable and rigidly connected to the handle assembly 11. As shown, pole 10 is equipped with a conventional reel 14 on which the fish line 15 is wound, and the reel is mounted at the top side 16 of the pole and rigidly connected to the handle by means of a suitable fastening device, designated at 17.

The handle assembly 11 includes an elongated rigid cylindrical shaft-like component 18 which is wrapped with cork or other suitable material to provide a suitable base end grip 19 that is located in back of the reel 17. The front end of the shaft 18 is fixed in an end socket 20 of another cylindrical component 21 of the assembly 11. Component 21 provides another grip 22 for the user and which is located in front of the reel 17 so that the reel 17 is mounted between the spaced grips on the shaft component 18 of the handle assembly.

The line carrying assembly 13 includes a pair of flexible rods designated respectively at 23 and 24. These rods are spaced apart and are generally mounted in a parallel arrangement in the assembly 13. The base ends 25 and 26 of the rods fit in laterally spaced sockets 27 and 28 at the front end of the cylindrical component 21 of the handle assembly. Here, as seen in FIG. 5, the rods 23 and 24 are rigidly spaced apart and interconnected by the socket type connection provided by the handle component 21, and are also fixed to the component 21 by an appropriate adhesive material designated at 29.

The rods 23 and 24 are circular in cross section in the illustration and are preferably of the well known and so-called "fiber glass" type construction. The rods taper uniformly from the base end 30 of the assembly 13 to a lesser diameter at the tip end 31 of the assembly so that rods are adapted to flex more readily toward the tip of the assembly. Here, at the tip end 31, the assembly 13 is provided with a line guide carrying coupling 37 which has a pair of laterally spaced sockets 35 and 36. The tip ends 32 and 33 of the rods fit in these sockets in assembly 13 and to also provide a rigid connection between the rod members at this end of the assembly, the rods are rigidly secured to the coupling 37 by a suitable adhesive material, designated at 34 in FIG. 6. The outer end of coupling 37 has a downwardly inclined bifurcated protuberance 38, as seen in FIGS. 1, 2 and 6, and here the line guide 39 at the tip of the assembly is formed in part by a pulley 40. This pulley 40 is located in the space between the legs 41 of the bifurcated protuberance and is rotatably mounted on a suitable pin 42 which is press fit in transversely aligned holes in the legs 41.

In contrast to the rigid connection provided for rods 23 and 24 at the base 30 and tip 31 ends of the rod assembly 13, between these ends, the rods are loosely coupled together by a plurality of rigid rod spacing elements that are collectively designated at 43. These spacers 43 are appropriately spaced apart from the opposite ends of the assembly 13 and are appropriately distributed and aligned along the longitudinal axis 44 of the assembly 13, to generally maintain a suitable spaced relation between the rods when the rods are bent during the play of a fish on the line 15.

The structure of these spacing elements 43 and the arrangement used in mounting the elements on the rods of the assembly 13 are illustrated in FIGS. 3, 4, 7 and 9 by reference to the rod spacer 45 adjacent the base end 30 of the rod assembly. Spacer 45 is a flat rigid plate-like hardened plastic element in the illustration and which is provided with a pair of spaced openings 46 and 47. The rods 23 and 24 extend through the openings 46 and 47 which are spaced transversely in the assembly 13 in the final assembly. The diameter of each opening is somewhat larger than the diameter of the rod at the location for the spacer in the assembly, as seen in FIG. 3. This arrangement provides the spacer 45 with a separate pivotal connection with each rod in the assembly and enables the spacer to pivot on each rod during use of the pole. For example, when the stresses imparted to the pole are such that rod 24 starts to move upwardly as viewed in FIG. 3, the spacer 45 is capable of pivotally moving in a clockwise direction (as viewed in FIG. 3) about the axis 48 of rod 23 while nevertheless retaining the rods in the spaced relation provided by the loose arrangement. The spacer is, of course, also capable of similar pivotal movement about the axis 49 of rod 24.

The loose arrangement also enables the spacer 45 to move or shift positions along the axis 44 of the assembly 13. In this respect however, the axial movement in the assembly is so limited as to maintain a suitable overall spaced arrangement between the several spacers 43 and suitable stops collectively designated at 50, are provided for this purpose.

The stops for spacer 45 are best seen in FIGS. 4, 7 and 9 wherein it will be seen that each rod is equipped at the location for the spacer 45 with a pair of annular elements 51 and 52. The rod extends through the elements and in the final assembly, the elements associated with each spacer are spaced apart and fixed to the rods by suitable adhesive material designated at 53.

Spacer 45 is carried on the rods between the annular elements 51 and 52 and the spacing between the elements is such as to permit a limited amount of lengthwise movement of the spacer 45 in the assembly. In practice, it has been found that rods 23 and 24 move axially in the connections with the spacers when the rods are caused to bend toward a rod side in the assembly and the arrangement provided is to accommodate the relative axial movement of one rod with respect to the other rod under such circumstances. This type of movement is illustrated in FIG. 9 for a situation where assembly 13 has been bent toward the right side rod 24 and wherein the relative axial movements of rods 23 and 24 with respect to each other as the assembly is bent is indicated by arrows 54.

The line guides between the opposite ends 30 and 31 of the assembly 13 are located at the bottom side 55 of the assembly and are collectively indicated at 56. These guides 56 are formed integral with and are thus carried by the spacers 43 in the preferred embodiment. The guide associated with spacer 45 is designated at 57 in FIGS. 3, 4 and 7 and wherein it will be noted that the plate-like spacer 45 has a bottom guide forming section 58 which is provided with an opening 59 for the fish line. Section 58 has an internal annular groove 60 which opens toward the axis of the opening 59 (FIG. 4) and the guide section 58 is here equipped with a metal ring 61 that fits in the groove 60 and serves as a wear element for the protection of the guide from abrasion by line 15.

The spacer arrangement provided between the opposite ends of assembly 13 has certain advantages. For one, apart from the influence that one rod exerts on the other because of the connections at the opposite ends of the assembly, any twisting force that is applied to one of the rods is distributed throughout the length of the rod and is handled by the rod independently of any twisting force applied to the other rod in the assembly. This provides greater mobility for the rod when it serves as a compression member in the assembly and enables it to bend easier under the applied forces. The arrangement also enables the rod member to more readily adjust to a situation where it serves as a tension member.

The action is best illustrated in FIG. 8 wherein pole 10 is shown being held by the user under conditions wherein line 15 is encountering a downwardly directed drag force from the left rod side of the assembly 13. Under the circumstances where the pole 10 is securely gripped and held by the user in the position shown, rod 23 is initially placed under a longitudinally acting compressive force when the drag on line 15 is first applied to the pole, and rod 24 is at this time placed under tension. With the arrangement forming the subject matter of the invention, rod 23 is able to twist somewhat when the lateral force is first encountered on the line 15 and because of its loose connection between the opposite ends of the assembly with rod 24 is better able to bend to the left. As rod 23 bends under the compressive force applied to the rod, the opposite ends 32 and 25 of the rod move relatively closer together at the compression side of the assembly. Initially, rod 24 also twists somewhat but is placed under tension. In adjusting to the relatively closer end movements of rod 23, one section or length 63 of rod 24 moves in the direction of arrow 62 about rod 23 and assumes an "on bottom" relation to rod 23 whereas the adjacent section or length 64 of rod 23 moves in the direction of the arrow and assumes an "on top" relation to rod 24 as shown in FIG. 8. All of this transpires with but little twisting of the coupling 37 at the tip end of the assembly. As the rods move, to the position shown in FIG. 8 under the force applied, it should be evident that the spacers 43 pivotally adjust and slide on rods 23 and 24 between the stops while nevertheless keeping the desired spacing between the rods.

If the spacers 43 were rigidly connected to the rods, rod 23 would be incapable of bending any appreciable amount to the left and hence the tip end 31 of assembly 13 would be drawn downwardly in the direction of least bending resistance and the assembly would twist as a unit in the direction of arrow 62 to adjust to the applied forces. Under such circumstances the tip end 31 of assembly 13 would be further offset from the axis of the handle assembly than shown in FIG. 8 and the user would experience a considerably greater twisting moment of force at the handle than under the arrangement advocated herein.

During the play of the game fish, the pole will of course bend to various positions between which the rods will alternate in functioning as compression members and tension members in the assembly, and consequently the "on top" and "on bottom" relations of the rods will rapidly change during use of the pole. During active play of the fish, the sections 63 and 64 tend to snap back and forth between the "on top" and "on bottom" positions, but the bottom arrangement of the guides 56 and the fact that the guides are carried by the spacers has the beneficial effect of cushioning the movements of the rod sections since the line exerts a force on each spacer when the pole is bent and which resists the movement of the sections 63 and 64 into the "on top" and "on bottom" positions.

While only a certain preferred embodiment of this invention has been shown and described by way of illustration, many modifications will occur to those skilled in the art and it is, therefore, desired that it be understood that it is intended herein to cover all such modifications as fall within the true spirit and scope of this invention.

What is claimed as new and what it is desired to secure by Letters Patent of the United States is:

1. In a fish pole having an elongated, bendable, line carrying assembly that includes a pair of elongated, flexible members which are rigidly interconnected at the opposite ends of the assembly, the improvement comprising the combination therewith of a spacer which is located in the assembly between said opposite ends, said spacer being longitudinally moveable in the assembly and pivotally connected to each of said members, and stop means arranged in the assembly to limit the longitudinal movement of the spacer in the assembly.

2. In a fish pole having an elongated, bendable, line carrying assembly that includes a pair of elongated, flexible members which are rigidly interconnected at the opposite ends of the assembly, the improvement comprising the combination in accord with claim 1 and further comprising a line guide carried by and moveable with said spacer at one side of said pole, and a reel mounted on said pole at the side opposite said one side of said pole.

3. A fish pole comprising the combination of an elongated bendable line carrying assembly having opposite ends including a tip end and a base end, and a reel carrying handle assembly secured to the line carrying assembly at the base end thereof; said line carrying assembly comprising a plurality of rigid elements which are aligned and longitudinally spaced apart in the line carrying assembly, each of said elements having a pair of openings which are transversely spaced apart in the line carrying assembly, a pair of elongated, flexible rods extending through the respective openings in each of said elements and being rigidly interconnected at said base end, line guide carrying means rigidly interconnecting said rods at said tip end, each of said elements being mounted on the rods for longitudinal sliding movement on the rods, and being pivotally moveable about the respective axes of said rods, and each of said elements having stop means associated therewith and arranged to limit the longitudinal movement of the element in the assembly.

4. A fish pole comprising the combination in accord with claim 3 wherein the reel is carried by the handle assembly at one side of the pole, and wherein each of said rigid elements has another opening at a side of the pole which is opposite said one side and through which the line extends between the reel and said line guide carrying means.

5. In a fish pole, an elongated bendable line carrying assembly having opposite ends and comprising a pair of elongated flexible rods which are laterally spaced in a generally parallel arrangement with one rod adjacent the other rod in the assembly, means rigidly interconnecting the rods at one of said opposite ends, means rigidly interconnecting the rods at the other of said opposite ends, and spacer means located between the opposite ends for maintaining a spaced relation between the rods at the location of said spacer means, said spacer means being pivotally connected and moveable with respect to each of said rods, and each of said rods being axially moveable in the assembly with respect to the other of the rods at the connection with said spacer means.

References Cited

UNITED STATES PATENTS

| | | | |
|---|---|---|---|
| 1,748,354 | 2/1930 | Laing | 43—18 X |
| 1,843,714 | 2/1932 | Fuller | 43—18 |
| 2,680,923 | 6/1954 | Hyland | 43—18 |

SAMUEL KOREN, *Primary Examiner.*

JAMES H. CZERWONKY, *Assistant Examiner.*

U.S. Cl. X.R.

43—18